United States Patent
Moshe et al.

(10) Patent No.: US 12,248,685 B2
(45) Date of Patent: Mar. 11, 2025

(54) DATA STORAGE DEVICE AND METHOD FOR REDUCING READ DISTURBS WHEN READING REDUNDANTLY-STORED DATA

(71) Applicant: Western Digital Technologies, Inc., San Jose, CA (US)

(72) Inventors: Eran Moshe, Kfar Saba (IL); Gadi Vishne, Petach Tikva (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/220,951

(22) Filed: Jul. 12, 2023

(65) Prior Publication Data

US 2024/0134537 A1 Apr. 25, 2024
US 2024/0231639 A9 Jul. 11, 2024

Related U.S. Application Data

(60) Provisional application No. 63/418,090, filed on Oct. 21, 2022.

(51) Int. Cl.
*G06F 12/00* (2006.01)
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
CPC ...... G06F 3/0619; G06F 3/064; G06F 3/0679; G06F 9/441
See application file for complete search history.

(56) References Cited

U.S. PATENT DOCUMENTS

| | | | |
|---|---|---|---|
| 5,434,996 A * | 7/1995 | Bell | G06F 13/405 713/400 |
| 5,941,994 A * | 8/1999 | DeKoning | G11B 20/1833 714/48 |
| 6,442,067 B1 | 8/2002 | Chawla et al. | |
| 6,981,136 B2 | 12/2005 | Fuse et al. | |
| 7,783,833 B2 * | 8/2010 | Kumagai | G06F 11/2082 711/170 |

(Continued)

FOREIGN PATENT DOCUMENTS

| | | | | |
|---|---|---|---|---|
| CA | 3085753 A1 * | 6/2019 | | G07F 17/3211 |
| CN | 104112156 A * | 10/2014 | | G06F 3/147 |

(Continued)

*Primary Examiner* — Shawn X Gu
*Assistant Examiner* — Mohammad S Hasan
(74) *Attorney, Agent, or Firm* — Crowell & Moring LLP (57) ABSTRACT

A data storage device and method for reducing read disturbs when reading redundantly-stored data are provided. In one embodiment, a data storage device is provided comprising a memory and a controller. The memory is configured to redundantly store a plurality of copies of data, wherein the plurality of copies of the data comprise a primary copy of the data and at least one secondary copy of the data. The controller is configured to randomly select one of the plurality of copies of the data instead of selecting the primary copy of the data as a default; and read, from the memory, the randomly-selected one of the plurality of copies of the data. Other embodiments are possible, and each of the embodiments can be used alone or together in combination.

18 Claims, 8 Drawing Sheets

(56) References Cited

U.S. PATENT DOCUMENTS

| | | | |
|---|---|---|---|
| 9,785,596 B2 | 10/2017 | Hodge et al. | |
| 10,146,627 B2 | 12/2018 | Yu et al. | |
| 2003/0093638 A1* | 5/2003 | Margerie | G06F 11/2007 |
| | | | 711/162 |
| 2010/0036851 A1* | 2/2010 | Paterson-Jones | G06F 3/0665 |
| | | | 707/E17.032 |
| 2012/0124307 A1* | 5/2012 | Ashutosh | G06F 11/1456 |
| | | | 711/E12.001 |
| 2018/0173536 A1 | 6/2018 | Sela et al. | |
| 2019/0354478 A1* | 11/2019 | Kashyap | G06F 11/1072 |
| 2023/0147295 A1* | 5/2023 | Guttapalem | G06F 3/0604 |
| | | | 711/162 |

FOREIGN PATENT DOCUMENTS

| | | | | |
|---|---|---|---|---|
| CN | 104731674 A | * | 6/2015 | |
| CN | 107479823 A | * | 12/2017 | ......... G06F 11/1056 |
| CN | 108733403 A | * | 11/2018 | .............. G06F 8/71 |
| CN | 111066011 A | * | 4/2020 | ......... G06F 12/0246 |
| CN | 114968668 A | * | 8/2022 | |
| CN | 115904226 A | * | 4/2023 | ........... G06F 3/0652 |
| CN | 115943619 A | * | 4/2023 | ............. A63F 13/31 |
| KR | 102118204 B1 | * | 6/2020 | |
| WO | WO-2012067964 A1 | * | 5/2012 | ......... G06F 11/1453 |

\* cited by examiner

DATA STORAGE DEVICE AND METHOD FOR REDUCING READ DISTURBS WHEN READING REDUNDANTLY-STORED DATA

CROSS-REFERENCE TO RELATED APPLICATION

This application claims priority to U.S. provisional patent application No. 63/418,090, filed Oct. 21, 2022, which is hereby incorporated by reference.

BACKGROUND

A data storage device can store primary and secondary copies of certain data. For example, a data storage device can store primary and secondary copies of a firmware image file that is used to boot-up the data storage device. The primary copy of the data is read as a default, and, if there is a problem in reading the primary copy, the secondary copy of the data is read. In the case of a firmware image file, the availability of the secondary copy of the data allows the data storage device to boot-up when there is a problem with the primary copy.

DETAILED DESCRIPTION

Overview

By way of introduction, the below embodiments relate to a data storage device and method for reducing read disturbs when reading redundantly-stored data. In one embodiment, a data storage device is provided comprising a memory and a controller. The memory is configured to redundantly store a plurality of copies of data, wherein the plurality of copies of the data comprise a primary copy of the data and at least one secondary copy of the data. The controller is configured to: randomly select one of the plurality of copies of the data instead of selecting the primary copy of the data as a default; and read, from the memory, the randomly-selected one of the plurality of copies of the data.

In some embodiments, the controller is further configured to randomly select the one of the plurality of copies of the data using a random number generator.

In some embodiments, the random number generator comprises a true random number generator (TRNG).

In some embodiments, the controller is further configured to randomly select of the one of the plurality of copies of the data using least-significant-bit (LSB) clock bits.

In some embodiments, the data comprises a firmware image file.

In some embodiments, the data comprises a log.

In some embodiments, the data comprises a system configuration file.

In some embodiments, the data comprises a configuration file for a phase-locked loop (PLL).

In some embodiments, the controller is further configured to determine which of the plurality of copies of the data is the primary copy based on a device mode that is randomly set during production of the data storage device.

In some embodiments, the plurality of copies of the data are stored in different physical blocks of the memory.

In some embodiments, the memory comprises a three-dimensional memory.

In another embodiment, a method is provided that is performed in a data storage device comprising a memory storing a plurality of copies of data. The method comprises: receiving a plurality of requests to read the data; and instead of automatically reading a same one of the plurality of copies of the data in response to every request of the plurality of requests unless a read error occurs, distributing reads among the plurality of copies of the data to reduce read disturb.

In some embodiments, the reads are distributed by tracking how many times each of the plurality of copies of the data have been read.

In some embodiments, the reads are distributed by randomly selecting one of the plurality of copies of the data for each of the plurality of requests.

In some embodiments, the data comprises a firmware image file.

In some embodiments, the data comprises a log.

In some embodiments, the data comprises a system configuration file.

In some embodiments, the data comprises a configuration file for a phase-locked loop (PLL).

In some embodiments, the method further comprises determining which of the plurality of copies of the data is a primary copy based on a device mode that is randomly set during production of the data storage device.

In another embodiment, a data storage device is provided comprising: a memory; and means for reducing read disturbs by randomly selecting one of a plurality of copies of data stored in the memory in response to a request to read the data.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
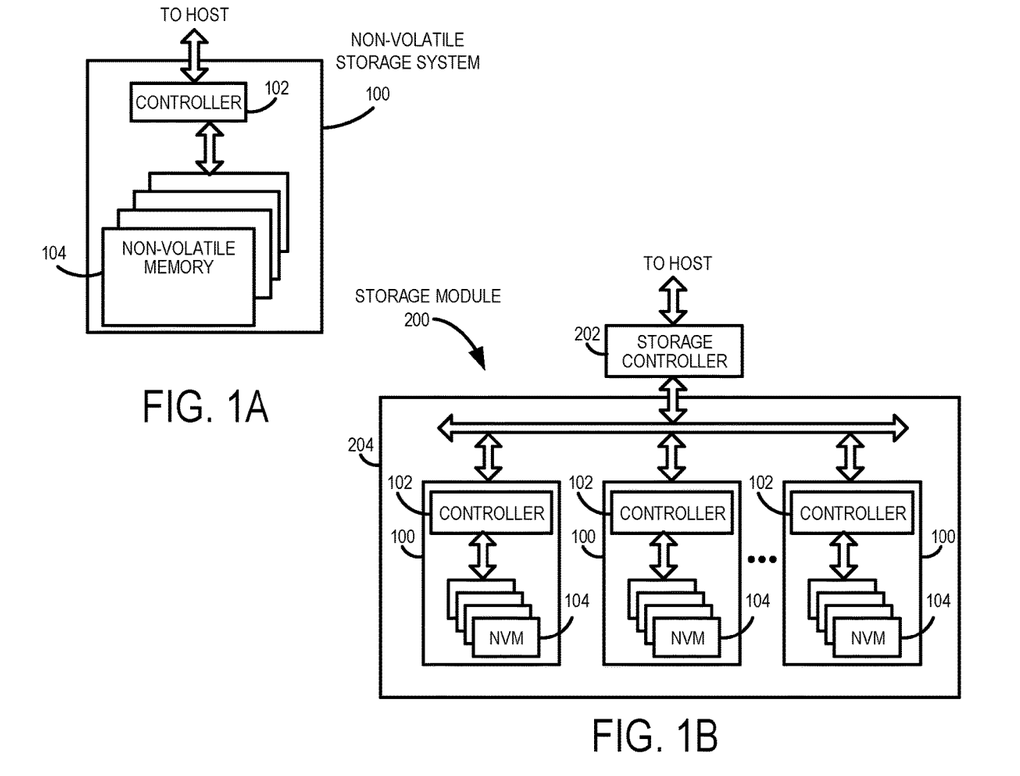
FIG. 1A is a block diagram of a data storage device of an embodiment.
FIG. 1B is a block diagram illustrating a storage module of an embodiment.
Figure 1C:
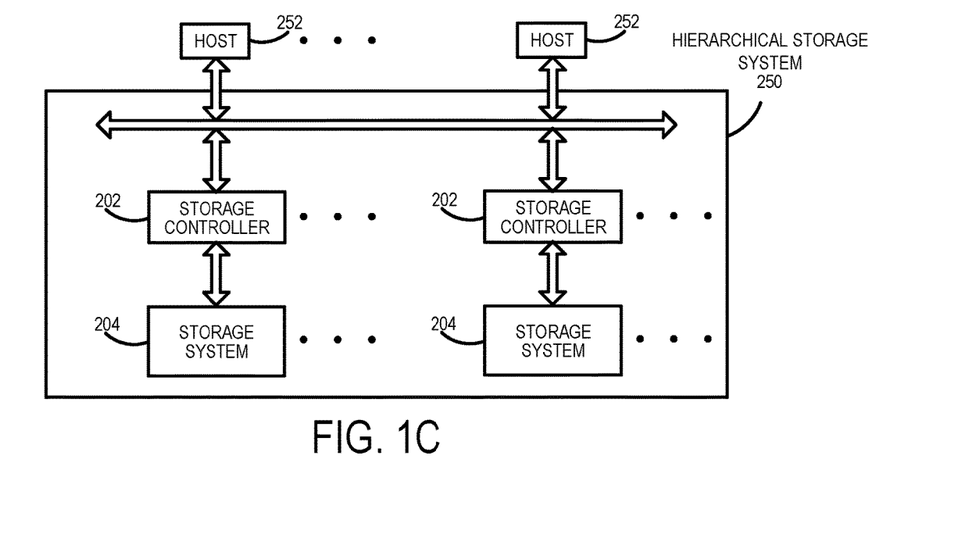
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
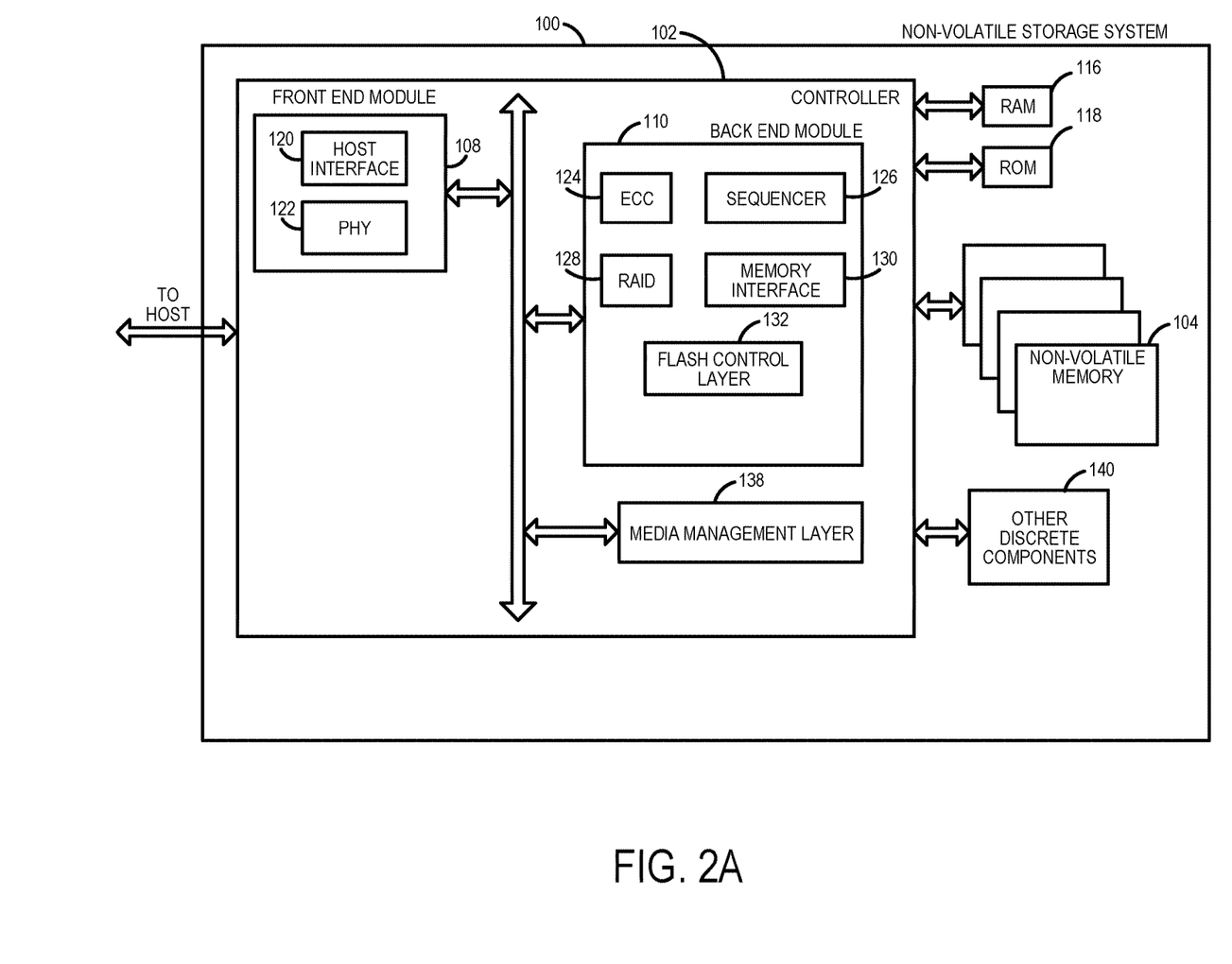
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
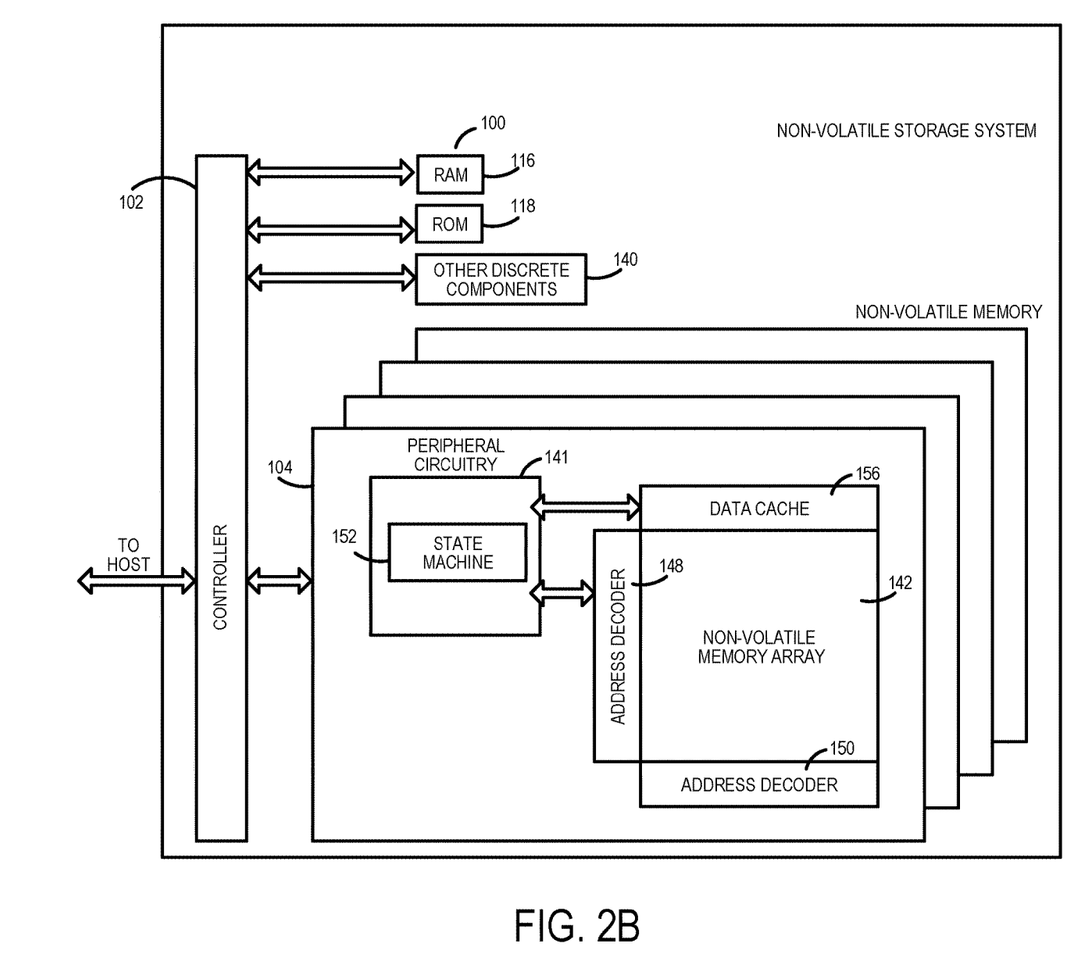
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
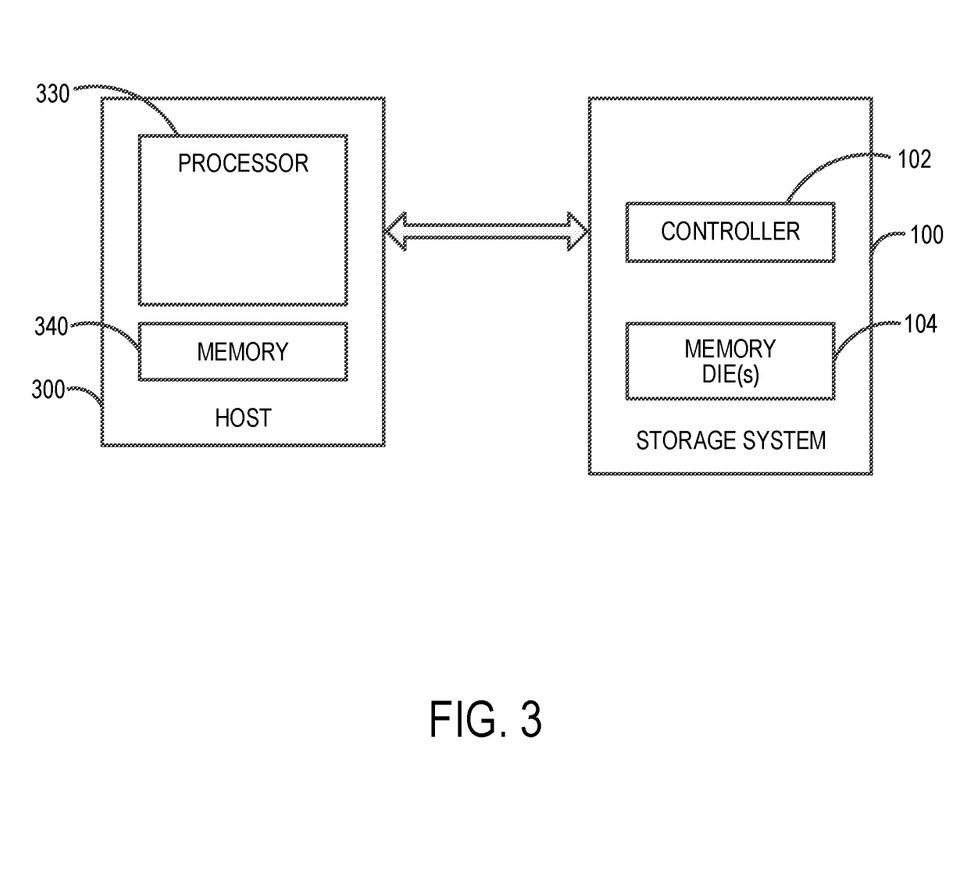
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can store multiple copies of data in its memory. That way, if there is a problem with reading one of the copies of the data, another copy can be read. Any desired data can be redundantly stored. Examples of such data are provided below. It should be understood that these are merely examples, and other types of data can be used.

One example of data that can be redundantly stored is a firmware image file, which can include, for example, a boot loader or firmware code. In operation, the file can be read from non-volatile memory of the data storage device and loaded to internal volatile memory (e.g., SRAM memory). Using that code, processors in the data storage device can jump to an entry point and run the firmware code to boot-up the data storage device. Each core can have a dedicated image, and the boot loader can be responsible for loading the code images to the volatile memory. Storing the files redundantly can improve boot flow.

Another example of data that can be redundantly stored is a log. Any type of log can be redundantly stored. For example, it may be desired to redundantly store copies of a log that record device history regarding a graceful or ungraceful shutdown. The log can be a memory buffer that stores the device history/configurations and last data mappings saved before a shut down. Such a log is useful in the recovery process and can indicate which blocks were used before the shutdown/reset. Redundantly storing copies of log can also provide quick access.

Yet another example of data that can be redundantly stored is a system configuration file. A system configuration file can be used to configure application-specific integrated circuits (ASICs) in the data storage device and can include static configuration. Information stored in a configuration file can include, but is not limited to, PCIe settings/configuration, flash memory configuration, and device default configuration and user settings.

As yet another example, phase-locked loop (PLL) configuration data can be stored multiple times, albeit not necessarily redundantly. The data storage device can configure frequencies/clocks by locking a PLL with a default configuration. However, sometimes the PLL has lock issues that are solved by using a different configuration after a timeout. These different configurations can be considered "multiple copies" for this purpose even though they may not be duplicative.

Figure 4:
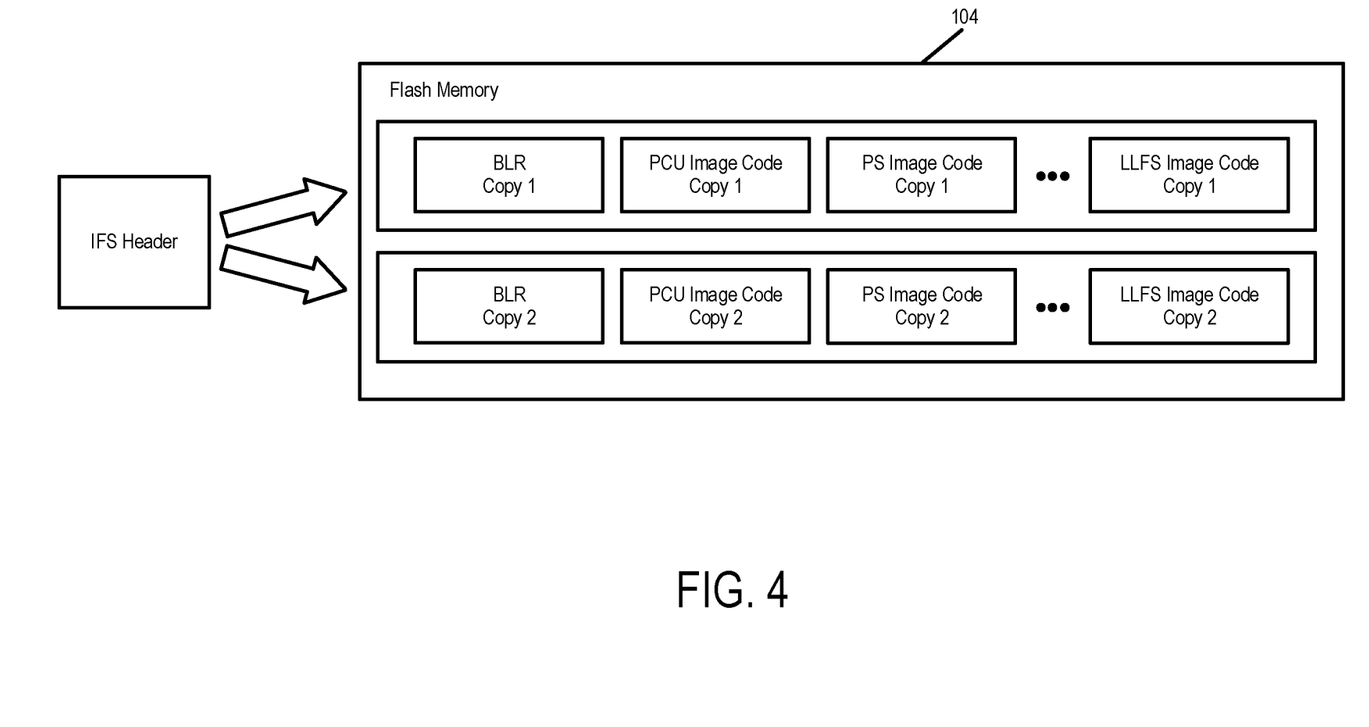
FIG. 4 is a block diagram of a memory of an embodiment that redundantly stores a plurality of copies of data.

Irrespective of the type of data, the data can be redundantly stored in any suitable way. For example, FIG. 4 shows various types of data that are redundantly stored as "Copy 1" and "Copy 2." The data can be stored in any suitable way. In one embodiment, some or all of these copies can be stored in different physical blocks of the memory 104 for redundancy. In some embodiments, one of the copies is designated as the primary copy, and the other copy is designated as the secondary copy. It should be noted that while only two copies are shown in FIG. 4, more than two copies can be stored. So, the phrase "at least one secondary copy" is used herein to refer to non-primary copies, however many there may be.

Referring again to FIG. 4, the controller 102 of the data storage device 100 can use any suitable mechanism to determine which of the two copies of data to read. For example, in one embodiment, information in an internal file system (IFS) header can be used to determine which copy to read. As mentioned above, in some embodiments, one of the copies of the data is designated as the primary copy, and the other copy is designated as the secondary copy.

Figure 5:
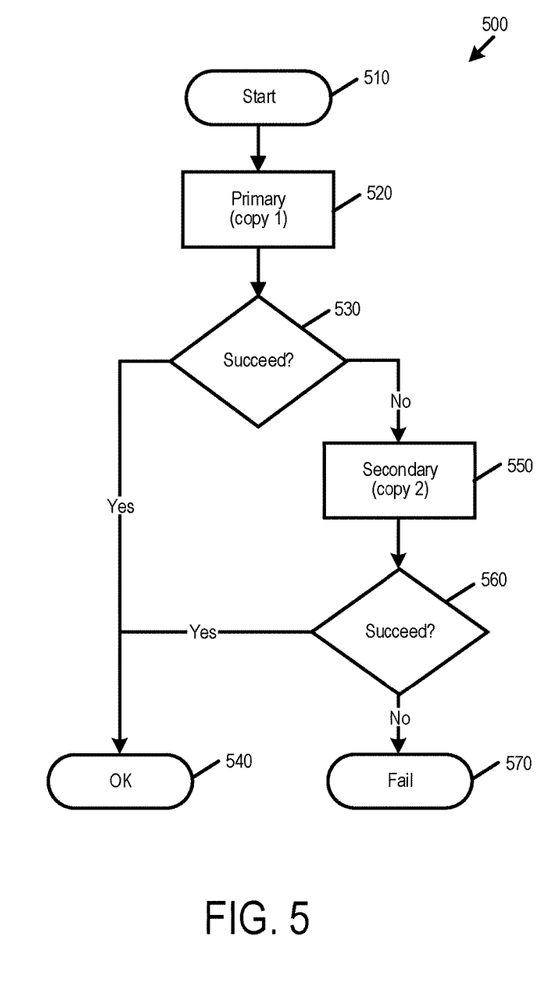
FIG. 5 is a flow chart of a method of an embodiment for reading primary and secondary copies of data.

FIG. 5 is a flow chart 500 of a method of an embodiment showing how the primary and secondary copies can be read. When the method starts (act 510), the controller 102 in the data storage device 100 attempts to read the primary copy of the data, which, in this example, is Copy 1 (act 520). The controller 102 then determines if the read was successful (act 530). If the read was successful, the read was ok (act 540). However, if the read was unsuccessful, the secondary copy (here, Copy 1) is read (act 550), and the controller 102 determines if that read was successful (act 560). If that read was successful, the read was ok (act 540); otherwise, the read fails (act 570).

As illustrated by this example, the primary copy of the data is read as a default, and, if there is a problem in reading the primary copy (e.g., when the primary copy is corrupted), the secondary copy of the data is read. In the case of the data being a firmware image file, the availability of the secondary copy of the data allows the data storage device to boot-up when there is a problem with the primary copy.

A problem can occur in this schema of reading the primary copy as a default and only reading the secondary copy when there is an error in reading the primary copy. More specifically, when the secondary copy is not used on a regular basis, there is a risk that the secondary copy can become corrupted, thereby eliminating the "backup protection" that the secondary copy is supposed to offer. This can occur because read disturbs that can corrupt the secondary copy increase when reading only from one physical block, and testing for such read disturbs can be very complicated.

Figure 6:
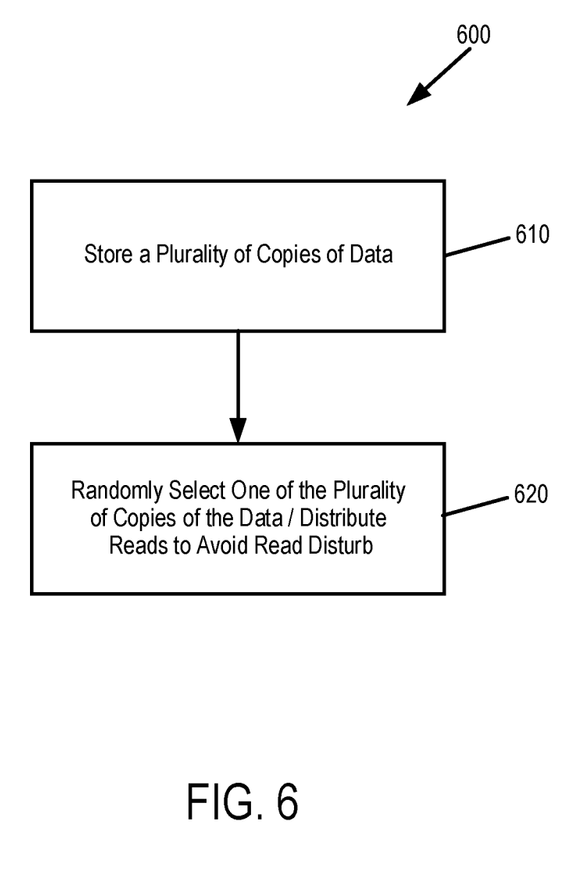
FIG. 6 is a flow chart of a method of an embodiment for randomly reading primary and secondary copies of data.

To address this problem, instead of reading the primary copy as a default and only reading the secondary copy if there is a problem with reading the primary copy, the controller 102 of the data storage device 100 is this embodiment can randomly select one of the plurality of copies of the data or otherwise distribute reads among the copies to reduce read disturbs (see acts 610, 620 in the flow chart 600 in FIG. 6). In this way, before a given read (or copy) operation, the controller 102 can select, in a random way, which of the various stored copies to read from the memory 104.

For example, the controller 102 can randomly select one of the plurality of copies of the data using a random number generator (e.g., internal to the controller 102). The random number can be generated, for example, using a true random number generator (TRNG) or least-significant-bit (LSB) clock bits. Of course, these are merely examples, and random numbers can be generated in any other desired way. Non-random techniques can be used as well. For example, instead of automatically reading the primary (or some other) copy of the data in response to every request to read the data, the controller 102 can distribute reads among the plurality of copies of the data to reduce read disturb (e.g., by tracking how many times each of the plurality of copies of the data have been read).

Irrespective of how reads are distributed among copies of the data, these embodiments provide several advantages. For example, by not reading the same copy of the data over and over again, these embodiments can reduce read disturb, which can be particularly advantageous when the data is stored in multi-level memory cells. Additionally, these embodiments can simplify flow coverage, improve usage of internally-stored data, and reduce read disturbs on management physical blocks. In addition, the embodiments can improve testing coverage and reliability, which increases the quality of the data storage device. Further, these embodiments can be implemented without the extra complexity of needing to log and read states. Also, these embodiments can be used to automatically find and select the best configurations out of a selection.

There are several alternatives that can be used with these embodiments. For example, instead of one particular copy (e.g., Copy 1) of data being the primary copy for every data storage device that contains that data, the primary copy can be determined based on a device mode that is randomly set during production of the data storage device. In this alternate embodiment, the various copies of the data are used on a regular basis by selecting which copy to load (e.g., during boot time) by a deterministic decision set for that particular data storage device, where different data storage devices can have different modes enabled. The decision can be done, for example, by using a Unique_Device_Id module 2, which selects the mode. The following code is an example implementation, and it is important to note that other implementations can be used.

```
Device Mode = Unique_Device_Id % 2
If (Device Mode == 0)
{
Device Order will be {Copy 1, Copy 2}
}
```

In this example, in mode 0, the data storage device 100 will use Copy 1 as the primary copy and will use Copy 2 as the secondary/backup copy.

```
If (Device Mode == 1)
{
Device Order will be {Copy 2, Copy 1}
}
```

In mode 1 in this example, the data storage device 100 will use Copy 2 as the primary copy and will use Copy 1 as the secondary/backup copy.

In one embodiment, the device mode is set randomly during the production of the data storage device, and it can be kept deterministic on each data storage device produced. When a data storage device always fails on the primary copy and uses the secondary copy, knowing which copy was the primary can be beneficial.

Figure 7:
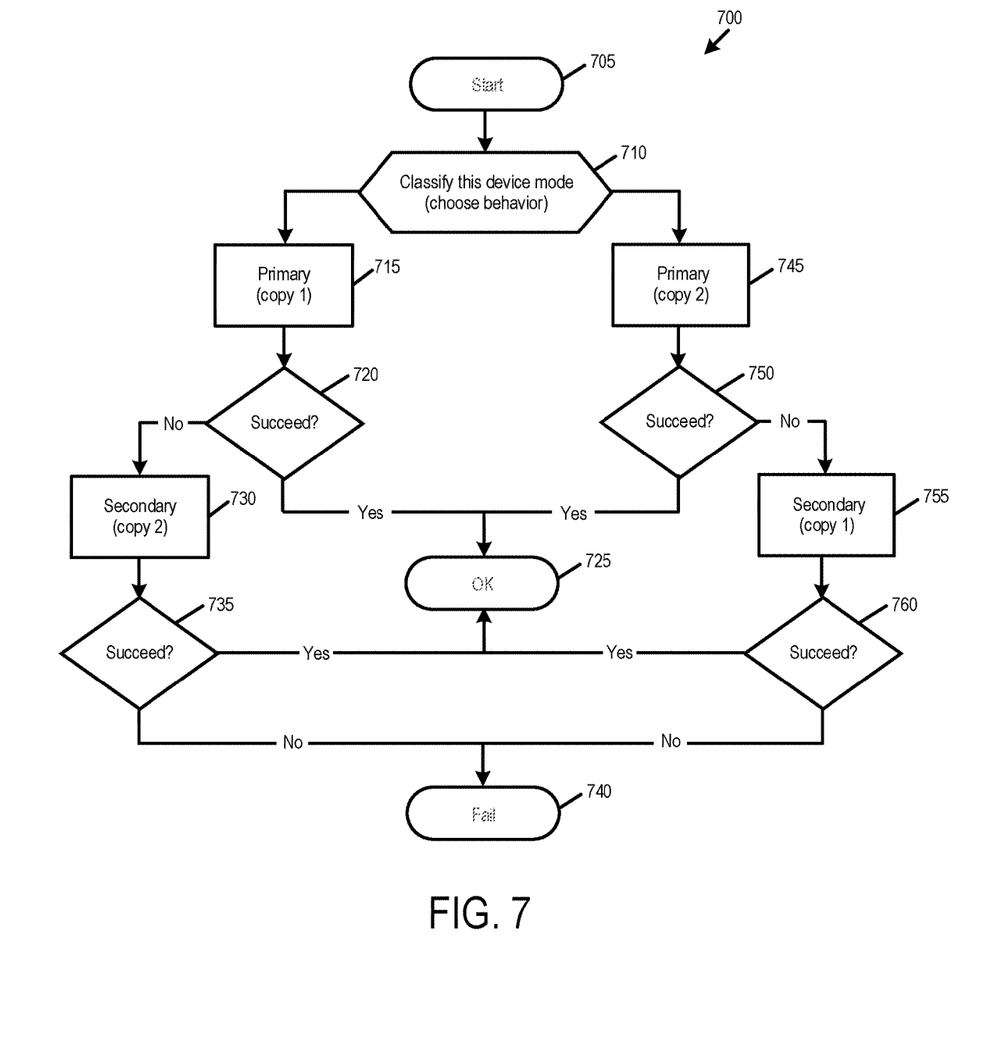
FIG. 7 is a flow chart of a method of an embodiment for determining which copies of data are primary and secondary copies.

This alternative will now be discussed in conjunction with the flow chart 700 of FIG. 7. As shown in FIG. 7, after the method starts (act 705), the controller 102 of the data storage device 100 classifies the device mode, which chooses the behavior of the data storage device 100. If the device mode indicates that the primary copy is Copy 1, the controller 102 reads Copy 1 (act 715) and determines if the read was successful (act 720). If it was, the read was ok (act 725); otherwise, Copy 2 is read (act 730), that read is checked (act 735), and the read succeeds or fails (acts 725, 740) accordingly. In contrast, if the device mode indicates that the primary copy is Copy 2, the controller 102 reads Copy 2 (act 745) and determines if the read was successful (act 750). If it was, the read was ok (act 725); otherwise, Copy 1 is read (act 755), that read is checked (act 760), and the read succeeds or fails (acts 725, 740) accordingly.

The data storage device 100 can use several configurations that provide the same target, such as a timer configuration, which can be based on a clock and divisors or multipliers. Different behavior can be observed for similar clock configurations, changes in lock time during initialization, and the accuracy of the clock. Further, when the configuration has more than two options, the "device mode" can be selected between the more than two options. More options give more reliability. Having more than two configurations (n, for example) can allow a constant order to be chosen, where the device mode is used to choose which configuration is the first, to define more configuration orders (e.g., up to n!), and to use the device mode to choose which order to use.

There are several advantages associated with this alternative embodiment. For example, if a correlation is determined between a specific configuration and the number of failures in a lab, the problem can be solved in foreground by disabling the bad configuration. Also, investigation can continue to find the real root cause of the problem in the background. This can increase reliability of produced data storage devices, reduce the research-and-development response time, and lower the possibility of field issues. So, these embodiments can improve the reliability for the data storage devices in the field and improve the coverage in lab testing as all the images are checked and run in normal operation.

In another alternative, any of the above embodiments can be used for cloud applications when some images/configurations can be read from different locations including different servers.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory configured to redundantly store a plurality of copies of data, wherein the plurality of copies of the data comprise a primary copy of the data and at least one secondary copy of the data; and
    a processor configured to:
        randomly select one of the plurality of copies of the data instead of selecting the primary copy of the data as a default; and
        read, from the memory, the randomly-selected one of the plurality of copies of the data.

2. The data storage device of claim 1, wherein the processor is further configured to randomly select the one of the plurality of copies of the data using a random number generator.

3. The data storage device of claim 2, wherein the random number generator comprises a true random number generator (TRNG).

4. The data storage device of claim 1, wherein the processor is further configured to randomly select one of the plurality of copies of the data using least-significant-bit (LSB) clock bits.

5. The data storage device of claim 1, wherein the data comprises a firmware image file.

6. The data storage device of claim 1, wherein the data comprises a log.

7. The data storage device of claim 1, wherein the data comprises a system configuration file.

8. The data storage device of claim 1, wherein the data comprises a configuration file for a phase-locked loop (PLL).

9. The data storage device of claim 1, wherein the processor is further configured to determine which of the plurality of copies of the data is the primary copy based on a device mode that is randomly set during production of the data storage device.

10. The data storage device of claim 1, wherein the plurality of copies of the data are stored in different physical blocks of the memory.

11. The data storage device of claim 1, wherein the memory comprises a three-dimensional memory.

12. A method comprising:
    performing the following in a data storage device comprising a memory storing a plurality of copies of data:
        receiving a plurality of requests to read the data; and
        instead of automatically reading a same one of the plurality of copies of the data in response to every request of the plurality of requests unless a read error occurs, distributing reads among the plurality of copies of the data to reduce read disturb, wherein the reads are distributed by tracking how many times each of the plurality of copies of the data have been read.

13. The method of claim 12, wherein the data comprises a firmware image file.

14. The method of claim 12, wherein the data comprises a log.

15. The method of claim 12, wherein the data comprises a system configuration file.

16. The method of claim 12, wherein the data comprises a configuration file for a phase-locked loop (PLL).

17. A data storage device comprising:
   a memory configured to storage a plurality of copies of data, wherein the plurality of copies of the data comprise a primary copy of the data and at least one secondary copy of the data; and
   means for:
      determining which of the plurality of copies of the data is a primary copy based on a device mode that is randomly set during production of the data storage device;
      receiving a request to read the data; and
      in response to receiving the request to read the data, reading the copy of the data that is determined to be the primary copy based on the device mode that is randomly set during production of the data storage device.

18. The method of claim 12, wherein the reads are distributed by randomly selecting one of the plurality of copies of the data for each of the plurality of requests.

* * * * *